May 29, 1928.

E. B. HIGGINS 1,671,864

PROCESS INVOLVING EXCHANGE REACTIONS

Filed Sept. 24, 1925     3 Sheets-Sheet 1

INVENTOR
Eric B. Higgins
BY Gill + Jennings
ATTORNEYS

May 29, 1928.
E. B. HIGGINS
1,671,864
PROCESS INVOLVING EXCHANGE REACTIONS
Filed Sept. 24, 1925  3 Sheets-Sheet 2
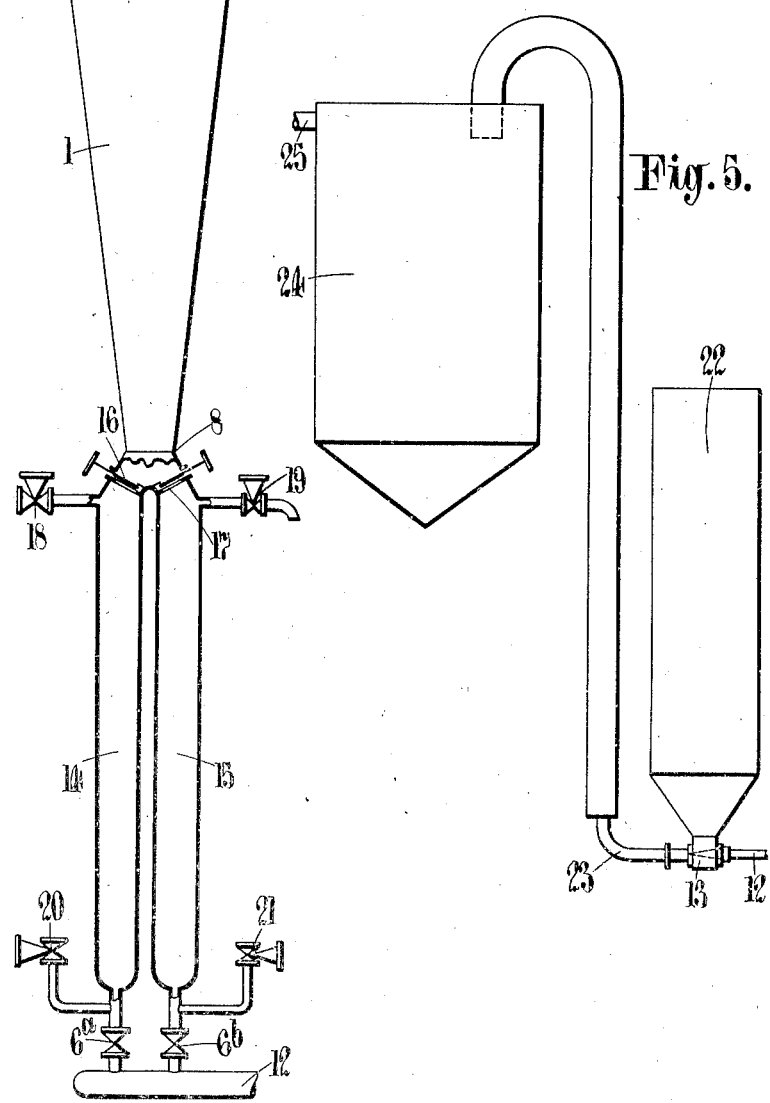
INVENTOR
Eric B. Higgins.
BY
Gill + Jennings
ATTORNEYS May 29, 1928.

E. B. HIGGINS 1,671,864

PROCESS INVOLVING EXCHANGE REACTIONS

Filed Sept. 24, 1925     3 Sheets-Sheet 3

INVENTOR
Eric B. Higgins.
BY
Gill + Jennings
ATTORNEYS

Patented May 29, 1928.

1,671,864

UNITED STATES PATENT OFFICE.

ERIC BERKELEY HIGGINS, OF LONDON, ENGLAND, ASSIGNOR TO UNITED WATER SOFTENERS LIMITED, OF LONDON, ENGLAND.

PROCESS INVOLVING EXCHANGE REACTIONS.

Application filed September 24, 1925, Serial No. 58,345, and in Great Britain October 1, 1924.

This invention relates to processes involving exchange reactions, that is to say, reactions in which an exchange material is employed to take up a substance and, subsequently, by a reversal, is restored to its active condition by a process usually known as regeneration. An example of such a reaction to which the present invention has particular reference is the softening of water by base exchange materials. Such reactions are considered to be true chemical reactions or to depend upon adsorption or to have the characteristics of both according to the conditions under which the process is carried out. Generally speaking the exchange material, for example the water softening material, has hitherto been employed in practice in the form of a filter bed, the integrity of which has been maintained during the process. The suggestion has, however, been made to work with the material in suspension in the water, but such suggestion has not matured into practical use. There are certain drawbacks, however, inherent in the method of using exchange material in the form of a filter bed. First of all the process cannot be truly continuous because the softening reaction has to be stopped after a certain period, and the exchange material has to be regenerated to be rendered fully active again. Again, particles of the exchange material which are finer than a certain grade cannot be employed in a filter as they tend to form a mud which would quickly fill up the interstices and choke the filter bed. Thus, for this reason there is a considerable waste of material, such as glauconite, which cannot be used in water softening owing to the fineness of its constituent particles. Again, with relatively coarse particles lying in a filter bed, there is such an amount of contact that substantial parts of the surfaces of the particles, which might be active and take part in the reaction, are prevented from doing so as they cannot come into contact with the water. It is recognized that in order to promote adsorption it is more important to increase the free surface of the exchange material than it is to increase the time of the reaction. The chief objects of the present invention then are to enable such exchange reactions to be carried out in such a manner that the free active surface of the exchange body is increased as much as possible, to enable the exchange material to be employed no matter in how fine a condition it may exist, and also, as far as possible, to enable such reactions to be carried out in truly continuous cycles. The invention further aims at reducing in size the necessary plant to the utmost extent as compared with apparatus required for known processes and, finally, at reducing the amount of exchange material necessary to deal with a given amount of the material to be treated.

According to the present invention the exchange material is maintained in a state of suspension during the reaction by the liquid taking part in the reaction, being caused to flow upwardly, that is to say, against the natural direction of fall of the exchange material. In the case of water softening, the exchange material may thus be maintained in a state of suspension by the upwardly flowing hard water, or it may be maintained in suspension during the regeneration process by the upward flow of the regenerating solution, usually common salt, or, of course, both parts of the process may be carried out while the exchange material is maintained in a state of suspension due to the upward flow of the respective liquids. By the present invention the net rate of fall of the exchange material is the difference between its natural speed of fall and the upward velocity of the liquid in question. The three cases which may arise in practice are as follows: If the upward velocity of the liquid is equal to the natural rate of fall of the exchange material, the actual rate of fall becomes zero, and in theory the exchange material remains stationary in space, and this condition can be sufficiently nearly approached in practice, although it is actually impossible to produce a flow of the liquid to be treated or of the regenerating liquid free from eddy currents. Secondly, the upward flow of the water may be at a velocity which is greater than the natural rate of fall of the exchange material. The actual rate of fall is negative, that is to say, the material moves upwardly in space at a velocity equal to the difference between the upward speed of the liquid and the natural rate of fall of the exchange material. Finally, the rate of upward flow of the liquid may be less than the natural rate of fall of the exchange material, and then the latter actually falls at a speed which is less than its natural rate of fall, being equal to the difference between its natural rate of fall and the upward velocity of the liquid. The time of contact between the exchange material and the liquid, as a whole to be treated, or the regenerating liquid, can be arranged as desired by suitable choice of the velocity of the liquid and by the length of the vessel or column in which the reaction takes place. If desired, the entire process, for example in the case of water softening, can be carried out in a complete cycle by arranging for the exchange material to come into contact with the parts of the water to be softened in succession, and then into contact with the regenerating liquid.

In order that the invention may be clearly understood and readily carried into effect, some examples of processes according to the invention, particularly as applied to water softening, will be described in detail with reference to the accompanying diagrammatic drawings, wherein:—

Figure 4 is again a similar view showing a development of the apparatus illustrated in Figure 2, by means of which the process can be brought nearer to a complete cycle;

Figure 5 is a similar view showing a further form of apparatus wherein the net movement of the exchange material in space is upward;

In Figures 1 to 4 forms of apparatus are illustrated suitable for carrying out the process in such a way that the upward speed of the liquid column is as near as is practicable equal to the natural rate of fall of the exchange material.

Figures 1, 2, 3:
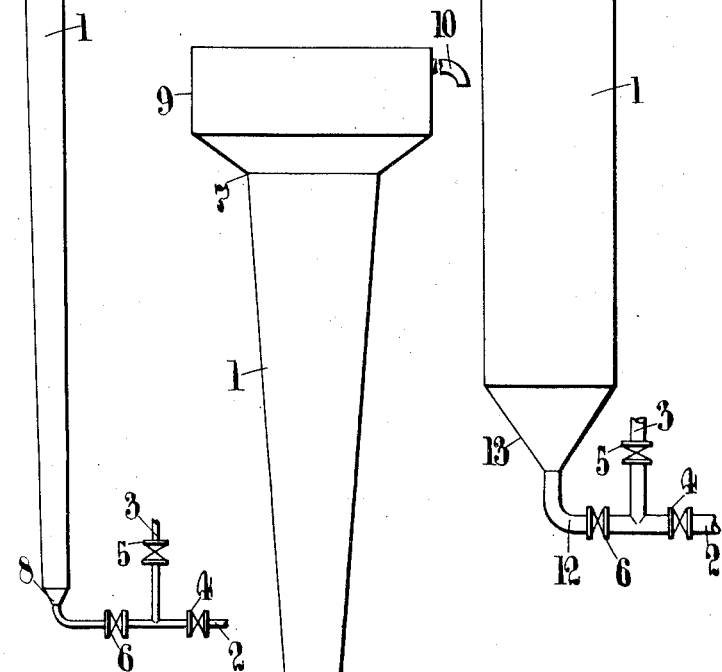
Figure 1 is a diagrammatic elevation of one form of apparatus in which the present invention may be carried out.
Figure 2 is a similar view showing a somewhat modified form of apparatus.
Figure 3 is again a similar view showing a somewhat further modified form of apparatus.

Referring first of all to Figure 1, a vessel 1 is employed, the cross-sectional area of which increases continuously from the bottom upward; in other words, the vessel 1 is in the form of a truncated cone with its vertex downward. A particular example may be considered wherein the base exchange material, for example glauconite, which has preferably been stabilized, for example by baking, has been graded by elutriation or otherwise so that none of its particles will move upwards in a stream of water moving at a linear velocity of 2.5 centimeters per second, and will not fall against a stream of water moving at 5 centimeters per second. This corresponds roughly with the glauconite wherein the particles will pass a sieve of 40 mesh but will be retained by a sieve of 60 mesh. The apparatus is arranged so that hard water may flow in by the pipe 2, and 10% common salt solution for regenerating purposes may flow in by the pipe 3. The pipe 2 has a stop valve 4, and the pipe 3 a stop valve 5, so that either or both of these supplies may be entirely shut off. The rate of flow of either of them upwardly through the vessel 1 is controlled by a regulating valve 6 and in the example under consideration it may be assumed that the valve 6 is set so that water or salt solution may flow through the apparatus at a rate of 2 gallons per minute.

Under these conditions the diameter of the vessel 1, at its upper edge at 7, may be 3 inches, giving a cross-sectional area corresponding to a linear velocity over the area of 2.5 centimeters per second at the rate of flow of the liquids mentioned above. Again, the diameter of the vessel 1, at its lower end at 8, may be $2\frac{1}{8}$ inches, which is calculated to give a cross-sectional area corresponding to a linear velocity over the area of 5 centimeters per second with the rate of flow of the liquids mentioned above. The height of the vessel 1, between the points 7 and 8, may be 6 feet, and the vessel is provided with an expansion 9 at its upper end, which may be 8 inches high from the point 7 to its upper edge, and may be 12 inches in effective diameter. The expansion 9 is provided with an outflow pipe 10.

The following cycle of operations may be performed in this apparatus. The valve 4 is closed and the valve 5 opened, for example for 30 seconds, during which time sufficient salt will have entered to regenerate the material, and then water allowed to flow first to waste by opening the valve 4 and shutting the valve 5 for say 3 minutes. This serves to wash out the brine from the glauconite in the vessel 1. The latter may contain approximately 8 kilogrammes of base exchange material. The water, after 3 minutes, is allowed to pass to a storage tank at will, and it will be found that the exchange material can soften water at the high rate of flow mentioned above, which is equal to an average metric flow of 135 meters per hour. Such an apparatus will deliver, for example with a hard water of 13 parts lime per 100,000, 28 to 30 gallons of soft water before regeneration is necessary, that is to say, in approximately 15 minutes.

If a coarser grade of base exchange material be employed, for example one in which none of its particles will move upwards in a stream of water moving upwards at 5 centimeters per second, and no particle will fall against a water stream flowing upwards at 10 centimeters per second, the only alteration in the apparatus described above that is necessary would be to change the diameters at the points 7 and 8 to respectively $3\frac{7}{16}$ inches and $2\frac{1}{4}$ inches. Such an apparatus would act as before except that its rate of softening would be equivalent to a mean metric flow of 270 meters per hour, and it would deliver its full charge of softened water in approximately 8 minutes, the feed of water to it being correspondingly increased to $3\frac{1}{2}$ gallons per minute.

The apparatus can be used open or under pressure but, of course, in the latter case the salt solution must be admitted, and the base exchange material washed when the apparatus is not connected to the water pressure delivery service. The arrangements for making appropriate connections for this purpose are not shown in the drawings as they are obvious and, of course, form no part of the present invention.

It is, of course, not necessary that the diameter specified at the point 7 should actually be at the top, provided that the diameter at 7 be not less than that specified for particular conditions. If the diameter at the top is greater, it merely means that the base exchange material, during operation, will not rise quite to the top of the vessel 1.

Furthermore, it is clear that base exchange material having a greater diversity in the dimensions of the grains and in their natural rates of fall may be employed if the taper of the conical vessel 1 be increased. Such an example is illustrated in Figure 2, where otherwise the same reference numerals have been applied as in Figure 1. It is only necessary that the liquid supply shall be fed at such a rate that at some point 8 the velocity shall be greater than that at which the largest particle of the base exchange material can fall, and that at some other point 7 the velocity shall be such that the smallest particle of the base exchange material shall sink.

It is also unnecessary that the vessel 1 shall be coned or tapered uniformly over its entire length. For example, in Figure 3 the vessel 1 is cylindrical in form, and the expansion 9 is joined to the vessel 1 by a conical portion 11, and the vessel 1 is joined to the supply pipe 12 by a further conical portion 13. The diameters are such that the upward velocity of the liquid in the vessel 1 is less than the rate at which the base exchange material rises in the liquid stream; the velocity of the liquid in the expansion 9 is such that the material falls in the water therein, while the rate of fall of the liquid in the part 13 is greater than the natural rate of fall of the coarsest particle of the exchange material. Thus, all of the exchange material is carried beyond a certain level in the part 13 but cannot rise above the tapered portion 11, and the majority of it is retained in the vessel 1. For example, with the grade of base exchange material referred to in the first example given above, the velocity of flow of the liquid in the part 13 must be above 5 centimeters per second, and the rate of flow in the part 9 must be below 2.5 centimeters per second, the rate of flow in the vessel 1 being between these two values.

In the modified form of the apparatus shown in Figure 4 the main part of the apparatus comprises a container 1 and an expansion 9 with an outflow pipe 10 substantially the same as shown in Figures 1 and 2. Below the vessel 1, however, there are a pair of receivers 14, 15, the diameter of each of which is less than the diameter of the vessel 1 at the throat 8. The receivers 14, 15 are in connection with the vessel 1 through valves 16, 17, and the hard water is introduced to one or other of the vessels 14, 15 alternately through regulating valves $6^a$ and $6^b$ from the pipe 12. Clearly, if the stream of water be disconnected entirely, the base exchange material in the container 1 will fall, due to its own weight, out of the container into one or other of the receivers 14, 15, according to which valve 16 or 17 is open, and then by closing the appropriate valve the material may be isolated in the receiver 14 or 15, which it fills, and may be there regenerated or otherwise treated. The receivers 14, 15 are connected to the drain through valves 18, 19, and to a supply of a regenerating solution through valves 20, 21. In softening water by the apparatus shown in Figure 4, the water may be admitted through valve $6^b$, receiver 15, valve 17, will be softened in the vessel 1, and the soft water will flow out through the pipe 10. The rate of flow of the water is such as to maintain the base exchange material above the throat 8 during the reaction. When the material is exhausted the valve $6^b$ is shut off, and the material immediately falls into the receiver 15. Then the valve 17 is closed and the valve $6^a$ and 16 opened, when another charge of base exchange material previously in the receiver 14 is swept up into the container 1 and softening goes on again. In the meantime, salt solution is admitted at 21, regenerates the material in the receiver 15, and flows out at 19. Then the valve 21 is closed, and water admitted through the valve $6^b$ to wash out the brine in the base exchange material in the vessel 15, and then flows out to waste at 19. The regenerated charge in the receiver 15 is ready to go back into the container 1 when the charge at present therein has dropped into the receiver 14. Thus, the softening and regenerating processes can be carried out nearly in a continuous cycle in the apparatus shown in Figure 4.

As already mentioned, Figure 5 illustrates an apparatus wherein the process may be carried out in a column in which the upward velocity of the liquid is at all points greater than the natural rate of fall of the largest particle contained in the exchange material. The base exchange material is contained in a vessel 22 and is there in the active or regenerated condition. The treating vessel 1 is a pipe shown of uniform cross-sectional area, although it may increase in cross-sectional area towards the bottom or the top, depending upon whether uniform velocity throughout the column is desired, or a decrease in velocity, or an increase in velocity. The water to be softened is admitted from a pipe 12 and passes through an injector 13, flowing into a pipe 23 and carrying with it a quantity of the base exchange material from the vessel 22. The water flows into the treating vessel 1 and when it leaves this vessel at the top, and runs over with the base exchange material into the receiver 24, it has become entirely softened, and base exchange material collects in the receiver 24, and the softened water flows out by the pipe 25. As an example of the conditions in which the necessary softening can be effected in the pipe 1, constituting the treating vessel, it may be mentioned that the pipe 1 may have a diameter of 2 inches and a height of 9 feet from the point of entry of the inlet of the injector 13 to the top of the pipe 1. The water is supplied through the pipe 12 at a rate of 1.62 gallons per minute, and the injector is designed so that in the pipe 1 one volume of base exchange material passes for every four volumes of water, the base exchange material being glauconite graded as in the first example discussed, so that the natural rates of fall of its particle lie between 2.5 and 5 centimeters per second. It will be noticed that in accordance with the present invention the conditions are arranged so that the reaction entirely takes place in the pipe 1 during the upward travel of the water in contradistinction to known apparatus in which the hard water is merely used for transporting the base exchange material upwardly through a pipe to place it upon a filter bed in the zone at which the actual softening takes place. Tha apparatus, having the dimensions described and as shown in Figure 5, will deliver water of zero hardness with a mean metric flow of 217 meters per hour.

Figure 6:
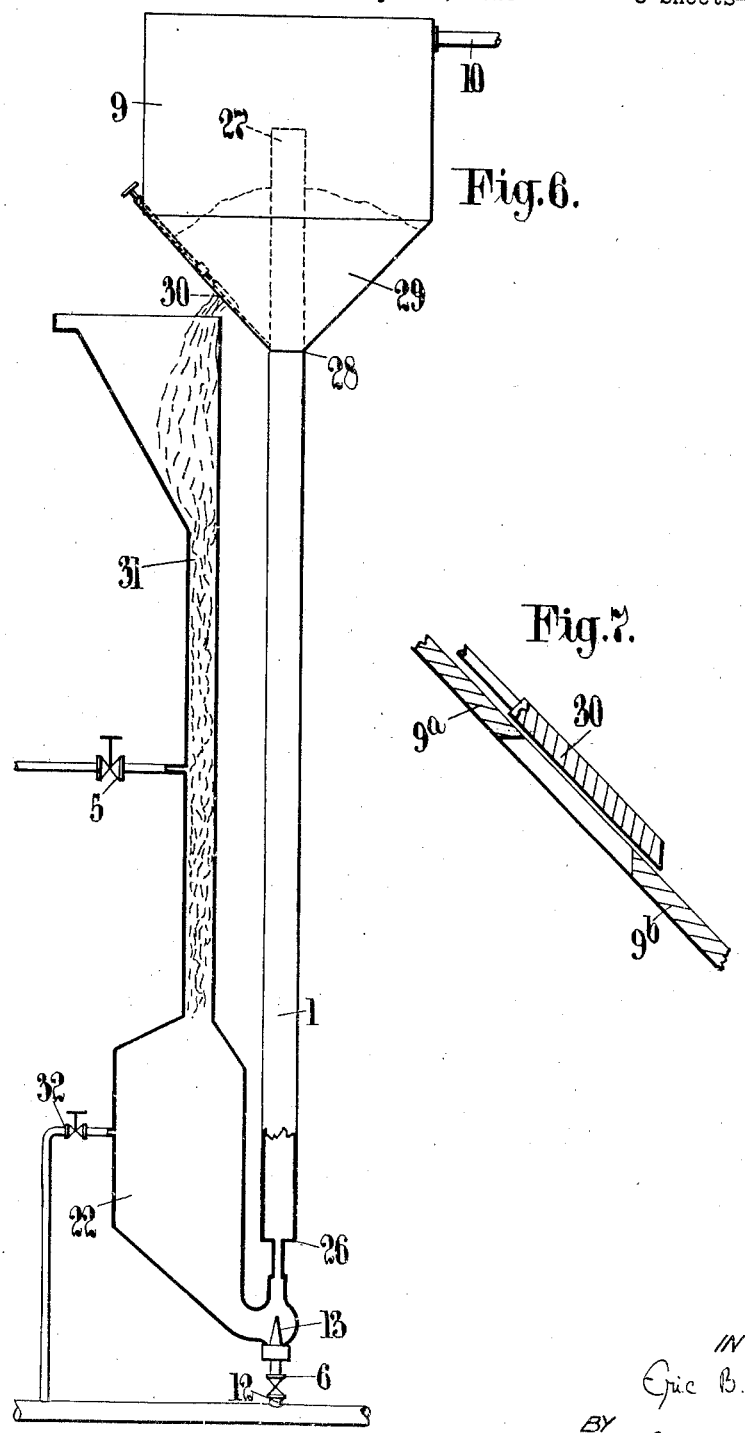
Figure 6 is a similar view showing an apparatus wherein more than one form of the invention is used at different parts of the cycle.
Figure 7:
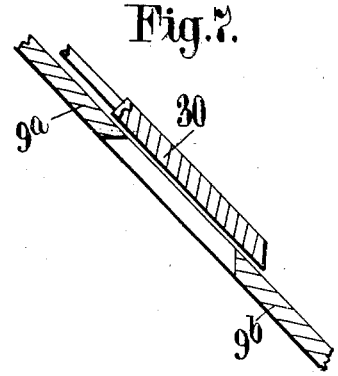
Figure 7 is a section showing a detail.

As already mentioned, the apparatus illustrated in Figures 6 and 7 makes use of the combination of more than one of the methods already indicated. It will be seen that different methods are employed in different parts of the treating apparatus. In Figure 6, the base exchange material, which may be considered to be glauconite in which all the particles have a natural rate of fall between 2.5 and 5 centimeters per second, is placed in the active or regenerated condition in the vessel 22, and exactly as in the system shown in Figure 5 is drawn into the treating vessel or pipe 1 by the hard water admitted through the pipe 12, and flowing through the injector 13. It may be assumed as before that the flow of water is regulated by the valve 6 at a rate of 1.6 gallons per minute, and that one volume of the above base exchange material is taken into the pipe 1 with four volumes of the hard water. Again, the pipe 1 may be 2 inches in internal diameter, and its height from the point 26 to the top at 27 is 12 feet. The pipe 1 extends into an expanded vessel 9 which may be one foot six inches in diameter and may be 2 feet in height from the point 28 to the top. The point 28 may be one foot below the point 27 so that the pipe 1 extends for one foot into the expanded vessel 9. 10 is the outflow for the soft water, as previously. The water, by the time it has reached the point 27 under the conditions just described, has attained zero hardness, and flows together with the base exchange material indicated at 29 into the expanded vessel 9, and thence through the outflow pipe 10. The base exchange material slowly flows out through a gate valve 30. This is shown somewhat in detail in Figure 7 where 9ª and 9ᵇ indicate the wall of the expanded vessel 9 on either side of the outlet aperture, the walls being chamfered inwards, as shown, and the sliding gate valve 30 is also chamfered, as shown, at its lower edge to produce a minimum resistance to the outflow of the wet glauconite. Without some such arrangement, the glauconite cannot be made to flow out through the valve. The glauconite drops into a further liquid column in a regenerating and washing vessel 31, the diameter of which may be, in the example chosen, 1½ inches. The height of the vessel 31 from the top of the vessel 22 to its uppermost edge may be 8 feet. Midway of this height is the inlet for the 10% common salt solution for regenerating purposes which takes place through the valve 5. The water for washing out the salt from the regenerated material enters through a valve 32, the rate of flow of the washing water being about the same as that of the salt, and approximately at 10 gallons per hour. Thus, the upward linear flow of the washing water in the lower part of the vessel 31 is 1 centimeter per second, and the upward flow of the mixed salt and washing water in the upper part of the vessel 31 is about 2 linear centimeters per second. Thus, the exhausted base exchange material will sink continuously in the vessel 31, slowly in the upper half but more quickly in the lower half, and returns to the vessel 22, keeping the latter substantially filled so that the rinsing water cannot flow back around the injector 13. It has been found that an apparatus of the dimensions indicated will soften water from 13 degrees of hardness to zero hardness at the rate mentioned of 1.6 gallons per minute, which is equivalent to a metric flow of 217 meters per hour.

Although the invention has been described in the particular examples in connection with its application to water softening and to the regeneration of the exchange material, it must be understood that it is not limited to such processes. It is also applicable to other cases wherein reversible adsorption takes place. For example, a known method for removing iron in solution from water consists in employing a zeolite or equivalent body substantially acting as a vehicle for the higher oxides of manganese. Very considerable difficulties are encountered in a filter of this material as the iron oxide liberated from the water clings to the grains of the manganese zeolite and quickly chokes the filter. If such a manganese zeolite is employed, for example in the apparatus illustrated in Figure 1, the reaction goes on perfectly. The particles of the exchange material are constantly in gentle agitation and, apparently, as a result of this, the iron oxide is rubbed off the surface of the grains, and being extremely light, is merely carried away by the rising water flowing over the top of the apparatus, and can be readily separated by filtration. The invention is also particularly applicable to cases in which reversible polar adsorption takes place; for example it may be applied where the exchange material is an adsorptive such as blood-charcoal, the treated material is an aqueous solution such as a solution of picric acid, and the regenerating agent is a less active solvent such as ethyl alcohol. Also, the invention may be applied to processes involving the reversible adsorption of radio active materials such as uranium X.1 by charcoal from aqueous solution wherein solutions of thorium salts and so forth are employed as the regenerating agent.

Having thus described my invention, what I claim as new and desire to secure by Letters Patent is:—

1. A process for carrying out an exchange reaction which consists in maintaining the exchange material in a state of suspension in a liquid to be treated until the exchange reaction has been substantially completed by means of the upward flow of the said liquid.

2. A process for carrying out an exchange reaction between an exchange material and a liquid which consists in maintaining an upward flow of the said liquid that at different points the speed is equal to the natural rates of fall of the different particles of the exchange material in the liquid, said speeds being ultimately altered when it is desired to remove the exchange material from the treating vessel.

3. A process for carrying out an exchange reaction between an exchange material and a liquid which consists in maintaining a linear speed of upward flow of the liquid greater than the natural rate of fall in the liquid of the coarsest particles of the exchange material, so that the latter travels upwards at a lower speed than that of the liquid and the exchange reaction is completed while the liquid is traveling upwards in contact with the exchange material.

4. A process for the softening of water by base exchange which consists in maintaining the exchange material in a state of suspension in an upward flowing column of hard water, which consists in maintaining the rate of flow of the hard water at such a speed that the exchange material is maintained in suspension for a period long enough for the exchange reaction to be substantially completed.

5. A process for carrying out a reaction depending upon the exchange of bases consisting in submitting an exchange material to the action of an upward current of liquid in a container and causing said liquid to flow upwardly at a linear velocity which decreases as the liquid rises so that there are zones in the liquid of progressively decreasing linear speeds, which latter are such that there is a linear speed equal to the natural rate of fall in the liquid of the particles of said exchange material of each different size.

6. A process for carrying out an exchange reaction between an exchange material in granular form and a liquid, which consists in maintaining an upward flow of the said liquid, supplying the granular material to said liquid and regulating the linear speeds of the liquid at the foot of the column of flow and at the head of the column so that the coarsest particles of the exchange material will not sink to the bottom and the finest particles will not escape over the top.

7. A process for the softening of water by base exchange which consists in maintaining the hard water to be treated in an upwardly flowing column, feeding a quantity of zeolite-like base exchange material to said column and regulating the linear speed of flow of the water at the foot of the column and at the head of the column so that the coarsest particles of the zeolite-like body will not sink to the bottom of the column and the finest particles will not escape over the top.

8. A process for the softening of water by base exchange which consists in subjecting an upward current of hard water in a container to the action of base exchange material in the granular form, causing the water to flow upwardly at a linear velocity which decreases as the water rises, so that there are zones in the current of liquid moving at progressively decreasing linear speeds, which latter are such that there is a linear speed equal to the natural rate of fall in the water of the particles of each different size of said exchange material so that said exchange material is maintained in a steady state of suspension in the hard water current continuously.

9. A process of water softening by means of base exchange material in the granular condition which consists in causing the hard water to be softened to flow upwardly in a column in a container at a linear velocity which decreases as the liquid rises, supplying th base exchange material to said column, .he varying linear velocity of the water being such that there are zones in the column of linear speeds just sufficient to maintain in suspension the particles of the exchange material of each different size, subsequently causing the base exchange material as it approaches exhaustion to leave the water column and to sink through a regenerating solution in preparation for fresh admission to the hard water column.

In witness wheieof, 1 hereunto subscribe my name this 15th day of September, A. D. 1925.

ERIC BERKELEY HIGGINS.